United States Patent
Usui et al.

(10) Patent No.: US 10,878,091 B2
(45) Date of Patent: Dec. 29, 2020

(54) ATTACK CODE DETECTION DEVICE, ATTACK CODE DETECTION METHOD, AND ATTACK CODE DETECTION PROGRAM

(71) Applicant: NIPPON TELEGRAPH AND TELEPHONE CORPORATION, Chiyoda-ku (JP)

(72) Inventors: Toshinori Usui, Musashino (JP); Makoto Iwamura, Musashino (JP); Takeshi Yada, Musashino (JP); Tomonori Ikuse, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 220 days.

(21) Appl. No.: 16/074,320

(22) PCT Filed: Feb. 22, 2017

(86) PCT No.: PCT/JP2017/006575
§ 371 (c)(1),
(2) Date: Jul. 31, 2018

(87) PCT Pub. No.: WO2017/146094
PCT Pub. Date: Aug. 31, 2017

(65) Prior Publication Data
US 2020/0042708 A1     Feb. 6, 2020

(30) Foreign Application Priority Data

Feb. 24, 2016   (JP) .................................. 2016-033610

(51) Int. Cl.
*G06F 21/56*      (2013.01)
*H04L 29/06*      (2006.01)

(52) U.S. Cl.
CPC .......... *G06F 21/566* (2013.01); *G06F 21/562* (2013.01); *H04L 63/1416* (2013.01); *G06F 2221/033* (2013.01)

(58) Field of Classification Search
CPC ................. G06F 21/566; G06F 21/562; G06F 2221/033; G06F 21/56; H04L 63/1416
See application file for complete search history.

(56) References Cited

U.S. PATENT DOCUMENTS 9,189,627 B1 *  11/2015  Islam .................... G06F 21/562
10,192,052 B1 *  1/2019  Singh .................... G06F 21/566
(Continued)

FOREIGN PATENT DOCUMENTS

JP    2010-146566 A    7/2010
JP    2015-527680 A    9/2015
(Continued)

OTHER PUBLICATIONS

Notice of Allowance dated Sep. 17, 2019 in Japanese Patent Application No. 2018-501734 (with unedited computer generated English translation), citing documents AA, AO and AX therein, 3 pages.

(Continued)

*Primary Examiner* — Meng Li
(74) *Attorney, Agent, or Firm* — Oblon, McClelland, Maier & Neustadt, L.L.P.

(57) ABSTRACT

An attack code detection device includes a learning unit configured to generate a model that learns, using a known labeled malicious document file including an ROP code, as learning data, a feature of a byte sequence being a component of a document file, and a feature of a byte sequence being a component of an ROP code, a detection unit configured to detect the ROP code included in an inspection target unknown document file, based on the model, and a malignancy determination unit configured to determine, based on a detection result, whether the inspection target unknown document file is a malicious data series that executes attack using ROP.

9 Claims, 14 Drawing Sheets

(56) References Cited

U.S. PATENT DOCUMENTS

| | | | |
|---|---|---|---|
| 10,341,365 B1* | 7/2019 | Ha | H04L 63/1425 |
| 2010/0162395 A1 | 6/2010 | Kennedy | |
| 2013/0117843 A1* | 5/2013 | Komaromy | G06F 11/3466 726/22 |
| 2014/0075556 A1* | 3/2014 | Wicherski | G06F 21/52 726/23 |
| 2014/0344932 A1 | 11/2014 | Polychronakis et al. | |
| 2015/0128266 A1* | 5/2015 | Tosa | G06F 21/52 726/23 |

FOREIGN PATENT DOCUMENTS

| | | | | |
|---|---|---|---|---|
| JP | 2016-9405 A | 1/2016 | | |
| WO | WO-2013040598 A1 * | 3/2013 | | G06F 21/562 |
| WO | WO 2014/152469 A1 | 9/2014 | | |

OTHER PUBLICATIONS

Usui, T., et al., "Static Detection of ROP Chain Based on Hidden Markov Model", The Institute of Electronics, Information and Communications Engineers, IEICE Technical Report, Feb. 2016, vol. 115 No. 488, pp. 71-76 (with English abstract).

Extended European Search Report dated Jun. 26, 2019, in Patent Application No. 17756532.2, citing documents AX-AY therein, 9 pages.

Cosovan D. et al., "A Practical Guide for Detecting JavaScript-based Malware using Hidden Markov Models and Linear Classifiers", 2014 16th International Symposium on Symbolic and Numeric Algorithms for Scientific Computing, XP055596685, Sep. 7, 2014, pp. 236-243.

Corona, I. et al., "Lux0R:Detection of Malicious PDF-embedded JavaScript code through Discriminant Analysis of API References", Artificial Intelligent and Security Workshop, XP058061391, Nov. 7, 2014, pp. 47-57.

International Search Report dated May 16, 2017, in PCT/JP2017/006575 filed Feb. 24, 2016.

Davi, L. et al., "ROPdeferider: A Detection Tool to Defend Against Return-Oriented Programming Attacks", Proceedings of the 6th ACM Symposium on Information, Computer and Communications Security, ASIACCS, 2011, pp. 40-51.

Stancill, B. et al., Check My Profile: Leveraging Static Analysis for fast and Accurate detection of ROP Gadgets, RAID, vol. 8145 of the series Lecture Notes in Computer Science, 2013, pp. 62-81.

Tanaka, Y. et al., "ROP Attack Code Static Detection Method of Malicious Documents File", Journal of Information Processing, vol. 56, No. 9, 2015, pp. 1693-1705.

* cited by examiner

FIG.3

| BYTE VALUE | LABEL | | | |
|---|---|---|---|---|
| ⋮ | ⋮ | | 0x00 | ROP (CONSTANT 1) |
| 0xff | DOCUMENT | | 0x30 | ROP (CONSTANT 2) |
| 0xd9 | ROP (ADDRESS 1) | | 0x00 | ROP (CONSTANT 3) |
| 0xac | ROP (ADDRESS 2) | | 0x00 | ROP (CONSTANT 4) |
| 0x01 | ROP (ADDRESS 3) | | 0x40 | ROP (CONSTANT 1) |
| 0x01 | ROP (ADDRESS 4) | | 0x00 | ROP (CONSTANT 2) |
| 0xe8 | ROP (ADDRESS 1) | | 0x00 | ROP (CONSTANT 3) |
| 0x11 | ROP (ADDRESS 2) | | 0x00 | ROP (CONSTANT 4) |
| 0x00 | ROP (ADDRESS 3) | | 0x62 | ROP (JUNK) |
| 0x10 | ROP (ADDRESS 4) | | 0xa1 | ROP (JUNK) |
| 0x52 | ROP (ADDRESS 1) | | 0x8d | ROP (JUNK) |
| 0xad | ROP (ADDRESS 2) | | 0x37 | ROP (JUNK) |
| 0x02 | ROP (ADDRESS 3) | | 0xd9 | ROP (ADDRESS 1) |
| 0x01 | ROP (ADDRESS 4) | | 0xac | ROP (ADDRESS 2) |
| 0x00 | ROP (CONSTANT 1) | | 0x01 | ROP (ADDRESS 3) |
| 0x00 | ROP (CONSTANT 2) | | 0x01 | ROP (ADDRESS 4) |
| 0x00 | ROP (CONSTANT 3) | | 0x4c | ROP (JUNK) |
| 0x00 | ROP (CONSTANT 4) | | 0x5d | ROP (JUNK) |
| 0x00 | ROP (CONSTANT 1) | | 0x32 | ROP (JUNK) |
| 0x10 | ROP (CONSTANT 2) | | 0x81 | ROP (JUNK) |
| 0x00 | ROP (CONSTANT 3) | | 0x31 | DOCUMENT |
| 0x00 | ROP (CONSTANT 4) | | ⋮ | ⋮ |

Ta

0x0101acd9

| LABEL (LATENT VARIABLE) | INITIAL STATE PROBABILITY |
|---|---|
| DOCUMENT | 1 |
| OTHER THAN DOCUMENT | 0 |

| LABEL (LATENT VARIABLE) \ BYTE (OBSERVATION VARIABLE) | 0x00 | ... | 0xFF |
|---|---|---|---|
| DOCUMENT | $b_{DOCUMENT, 0x00}$ | ... | $b_{DOCUMENT, 0xFF}$ |
| ROP (ADDRESS 1) | $b_{ROP (ADDRESS 1), 0x00}$ | ... | $b_{ROP (ADDRESS 1), 0xFF}$ |
| ⋮ | ⋮ | ⋮ | ⋮ |

| TRANSITION SOURCE (LABEL) \ TRANSITION DESTINATION (LABEL) | ROP (ADDRESS 1) | ROP (ADDRESS 2) | ... | ROP (JUNK) | DOCUMENT |
|---|---|---|---|---|---|
| DOCUMENT | a<sub>DOCUMENT, ROP (ADDRESS 1)</sub> | a<sub>DOCUMENT, ROP (ADDRESS 2)</sub> | ... | a<sub>DOCUMENT, ROP (JUNK)</sub> | a<sub>DOCUMENT, DOCUMENT</sub> |
| ROP (ADDRESS 1) | a<sub>ROP (ADDRESS 1), ROP (ADDRESS 1)</sub> | a<sub>ROP (ADDRESS 1), ROP (ADDRESS 2)</sub> | ... | a<sub>ROP (ADDRESS 1), ROP (JUNK)</sub> | a<sub>ROP (ADDRESS 1), DOCUMENT</sub> |
| ... | ... | ... | ... | ... | ... |
| ROP (JUNK) | a<sub>ROP (JUNK), ROP (ADDRESS 1)</sub> | a<sub>ROP (JUNK), ROP (ADDRESS 2)</sub> | ... | a<sub>ROP (JUNK), ROP (JUNK)</sub> | a<sub>ROP (JUNK), DOCUMENT</sub> |

| TIME t ={1,2,⋯,T} | BYTE SEQUENCE O ={o₁,o₂⋯o_T} | LABEL COMBINATION S={s₁, s₂,⋯s_T} | | | | | |
|---|---|---|---|---|---|---|---|
| | | 1 | 2 | ⋯ | k | ⋯ | K |
| 1 | 0x30 | DOCU-MENT | DOCU-MENT | ⋯ | DOCU-MENT | ⋯ | DOCU-MENT |
| 2 | 0x00 | DOCU-MENT | DOCU-MENT | ⋯ | ROP (ADDRESS 1) | ⋯ | ROP (ADDRESS 1) |
| 3 | 0x00 | DOCU-MENT | ROP (ADDRESS 1) | ⋯ | ROP (ADDRESS 2) | ⋯ | ROP (ADDRESS 4) |
| ⋮ | ⋮ | ⋮ | ⋮ | ⋮ | ⋮ | ⋮ | ⋮ |
| T | 0xff | DOCU-MENT | DOCU-MENT | ⋯ | DOCU-MENT | ⋯ | ROP (JUNK) |

| TIME t | BYTE SEQUENCE O | LABEL SEQUENCE S* |
|---|---|---|
| 1 | 0x30 | DOCUMENT |
| 2 | 0x00 | ROP (ADDRESS 1) |
| 3 | 0x00 | ROP (ADDRESS 2) |
| ⋮ | ⋮ | ⋮ |
| T | 0xff | DOCUMENT |

ATTACK CODE DETECTION DEVICE, ATTACK CODE DETECTION METHOD, AND ATTACK CODE DETECTION PROGRAM

FIELD

The present invention relates to an attack code detection device, an attack code detection method, and an attack code detection program.

BACKGROUND

Recently, danger caused by malicious document files becomes obvious. The malicious document file is a document file formed such that, if the file is opened by a viewer application for viewing the content, attack is started, and causes infection with malware.

Many of such malicious document files include, in the document files, exploit codes for exploiting vulnerability. The exploit code is a code for exploiting vulnerability for implementing a malicious operation. Many of attacks exploit vulnerability with a view to causing an arbitrary code of an attacker to be executed, and the malicious document file exploits vulnerability using the exploit code, causes an attack target to execute an attack code, and finally download and execute malware. As the attack code, a shellcode and a Return Oriented Programming (ROP) code are used.

First, the shellcode is a machine language code created by an attacker, and can cause an application to perform an arbitrary operation according to a created code. For realizing attack using the shellcode, it is necessary to inject the shellcode by writing the shellcode into a memory, and execute the shellcode. Nevertheless, in recent years, it becomes difficult to make attack successful only by the shellcode, due to the proliferation of a data execution prevention mechanism that makes a writable memory region inexecutable.

Accordingly, danger of a new attack method called ROP attack becomes obvious. The ROP attack is an attack method of controlling a return destination by exploiting vulnerability and overwriting a call stack, and implementing the execution of an arbitrary code by patching up existing codes in a library and the like by the repetition of ret commands. In addition, an existing code to be patched up that exists in the destination of return caused by ROP is referred to as an ROP gadget.

The ROP attack is implemented in the following procedure. First, an attacker takes advantage of vulnerability such as buffer overflow, and checks that a call stack is rewritable. The attacker can thereby control subsequent return destinations. Subsequently, the attacker generates a code with which the call stack is to be overwritten. At this time, the attacker generates a code that can implement an arbitrary operation, by patching up existing codes in a library and the like, by the repetition of return. The generated code is referred to as an ROP code. Then, by overwriting the call stack with the ROP code, the attacker causes an attack target to execute an arbitrary code of the attacker. The general procedure of ROP has been described above. In the ROP attack, an arbitrary code can be executed without injecting a shellcode.

Although the ROP attack can execute an arbitrary code without being influenced by the data execution prevention mechanism, there is a limitation on the length of an ROP code depending on the environment of an attack target, and free attack often fails to be implemented. Thus, in recent years, many of attack methods avoid the data execution prevention mechanism by a short ROP code, and implement an actual malicious operation by a shellcode. In particular, there is discovered a document file that performs attack such as download of malware, by exploiting vulnerability, executing an ROP code, bringing a shellcode into an execute state, and then, executing the shellcode.

The malignancy determination of document files is necessary for detecting danger caused by the above-described malicious document files, and addressing the danger. As a method of determining the malicious document file, there is a method of detecting whether an exploit code or an attack code is included in a document file.

Here, there exist a case in which an exploit code is included in a document file, and a case in which an exploit code is not included in a document file. For example, a malicious document file that often exploits ScriptEngine or plug-in vulnerability, like a Portable Document Format (PDF), highly-possibly includes an exploit code. On the other hand, a malicious document file that often exploits vulnerability existing in defect in the dealing of a format of a viewer application, like an Object Linking and Embedding (OLE) format, often does not include an exploit code. Thus, the detection of an attack code becomes an effective method.

Nevertheless, in some cases, it is difficult to detect a shellcode, which is one of attack codes. For example, this is because there exists a method in which a shellcode is encoded, and the shellcode is decoded immediately before the execution. In this case, because features of the shellcode are hidden by the encoding, the detection of the shellcode becomes difficult. Thus, malignancy determination performed by the detection of shellcodes fails to correctly function in some cases. In view of the foregoing, a technology of detecting an ROP code among attack codes becomes important. As the method of detecting an ROP code, the following methods are conventionally proposed.

For example, in Non Patent Literature 1, the following method is proposed. In the method described in Non Patent Literature 1, first, an execution command is monitored, and a return address pushed on a stack when a call command is executed is saved on a shadow stack. Then, whether return is appropriately performed is verified by comparing a return address that serves as a destination of return when a ret command is executed, and an address saved on the highest of the shadow stack, and ROP is detected. Non Patent Literature 1 describes that, using this method, ROP can be detected without erroneous detection, by experiment.

In addition, for example, Non Patent Literature 2 proposes a method of opening a viewer application of an inspection target document file on a virtual environment, acquiring a memory snapshot, and performing analysis. As the analysis, first, addresses included in the memory snapshot are extracted, and how candidates of ROP gadgets operate is profiled. Then, profiling of the entire ROP code is performed based on the profiling.

Then, Non Patent Literature 3 proposes a method of statically performing policy-based detection based on the feature of an ROP code. In this method, an ROP code can be statically detected without depending on a signature, and erroneous detection of harmless document files is extremely rare.

CITATION LIST

Non Patent Literature

Non Patent Literature 1: L. Davi, A. Sadeghi, and M. Winandy, "ROPdefender: A Detection Tool to Defend Against Return-Oriented Programming Attacks", Proceedings of the 6th ACM Symposium on Information, Computer and Communications Security, Pages 40-51, ASIACCS, 2011

Non Patent Literature 2: B. Stancill, K. Z. Snow, N. Otterness, F. Monrose, L. Davi and A. Sadeghi, "Check My Profile: Leveraging Static Analysis for Fast and Accurate Detection of ROP Gadgets", Volume 8145 of the series Lecture Notes in Computer Science, pp 62-81, RAID, 2013

Non Patent Literature 3: Yasuyuki Tanaka, Atsuhiro Goto, "ROP Attack Code Static Detection Method of Malicious Document File", Journal of Information Processing, Vol. 56, No. 9, 1693-1705 (September 2015)

SUMMARY

Technical Problem

Nevertheless, in the dynamic method described in Non Patent Literature 1, monitoring of an execution command is necessary, an inspection target document file needs to be opened using a viewer application on a virtual environment, and a Dynamic Binary Instrumentation (DBI) technology is used when the execution command is monitored. Thus, execution speed of the viewer application itself also decreases. This causes such a problem that a fixed time is required for the inspection of a file.

In addition, in the method described in Non Patent Literature 2, although analysis can be performed in a shorter time than dynamic analysis that uses the DBI technology, and furthermore, association can be performed so as to indicate what type of gadget is indicated by an address in an ROP code, it takes time for the execution on the virtual environment, and the acquisition of the memory snapshot. This causes such a problem that a fixed time is required.

Then, the method described in Non Patent Literature 3 has such a problem that an attacker who knows a policy highly-possibly avoids because a deterministic detection method is employed. In addition, there is such a problem that, in the policy proposed in Non Patent Literature 3, for example, a very short ROP code or an ROP code formed across a plurality of libraries highly-possibly fails to be detected.

The present invention has been devised in view of the foregoing, and the object of the present invention is to provide an attack code detection device, an attack code detection method, and an attack code detection program that can realize high-speed and highly-accurate detection of an ROP code while preventing an attacker from avoiding ROP detection.

Solution to Problem

An attack code detection device includes: a learning unit configured to generate a model that learns, using a known malicious data series including a Return Oriented Programming (ROP) code, as learning data, a feature of a byte sequence being a component of a data series, and a feature of a byte sequence being a component of an ROP code; a detection unit configured to detect the ROP code included in an inspection target unknown data series, based on the model; and a malignancy determination unit configured to determine, using a detection result of the detection unit, whether the inspection target unknown data series is a malicious data series that executes attack using ROP.

Advantageous Effects of Invention

According to the present invention, high-speed and highly-accurate detection of an ROP code can be realized while preventing an attacker from avoiding ROP detection.

BRIEF DESCRIPTION OF DRAWINGS

FIG. 3 is a diagram for describing an ROP code part in a file illustrated in FIG. 2.

FIG. 6 is a diagram illustrating a table that associates an initial state probability of a latent series for each latent variable (label).

FIG. 7 is a diagram illustrating a table that associates an output probability of an observation variable (byte) for each latent variable (label).

FIG. 8 is a diagram illustrating a table that associates a transition probability between latent variables (labels), for each combination of latent variables that transition.

FIG. 12 is a diagram for describing all combinations of label sequences assumed by a detection unit illustrated in FIG. 1.

FIG. 13 is a diagram for describing an example of label sequences granted by the detection unit illustrated in FIG. 1, to byte sequences of an inspection target file.

DESCRIPTION OF EMBODIMENTS

An embodiment of the present invention will be described in detail below with reference to the drawings. In addition, the present invention is not limited by the embodiment. In addition, in the description of the drawings, the same parts are assigned the same signs.

First Embodiment

Regarding an attack code detection device according to a first embodiment, a schematic configuration of the attack code detection device, and a processing flow and a specific example in the attack code detection device will be described.

Using known malicious data series including an ROP code, the attack code detection device according to the first embodiment generates, in advance, a probability model that learns features of byte sequences included in each of a document file part and an ROP code part. Then, based on the generated probability model, for an unknown document being an inspection target, the attack code detection device labels byte sequences forming the document, with a label (document label) indicating that it is a component of a document file, or label (ROP label) indicating that it is a component of an ROP code. The attack code detection device according to the first embodiment thereby detects whether the unknown document includes an ROP code part, without opening the unknown document using a viewer application.

Thus, the attack code detection device according to the first embodiment implements detection of an ROP code part included in the inspection target unknown document, at high speed by so-called heuristic determination. The heuristic determination defines probability of an ROP code based on learning performed so far, and performs determination according to the definition.

[Configuration of Attack Code Detection Device]

Figure 1:
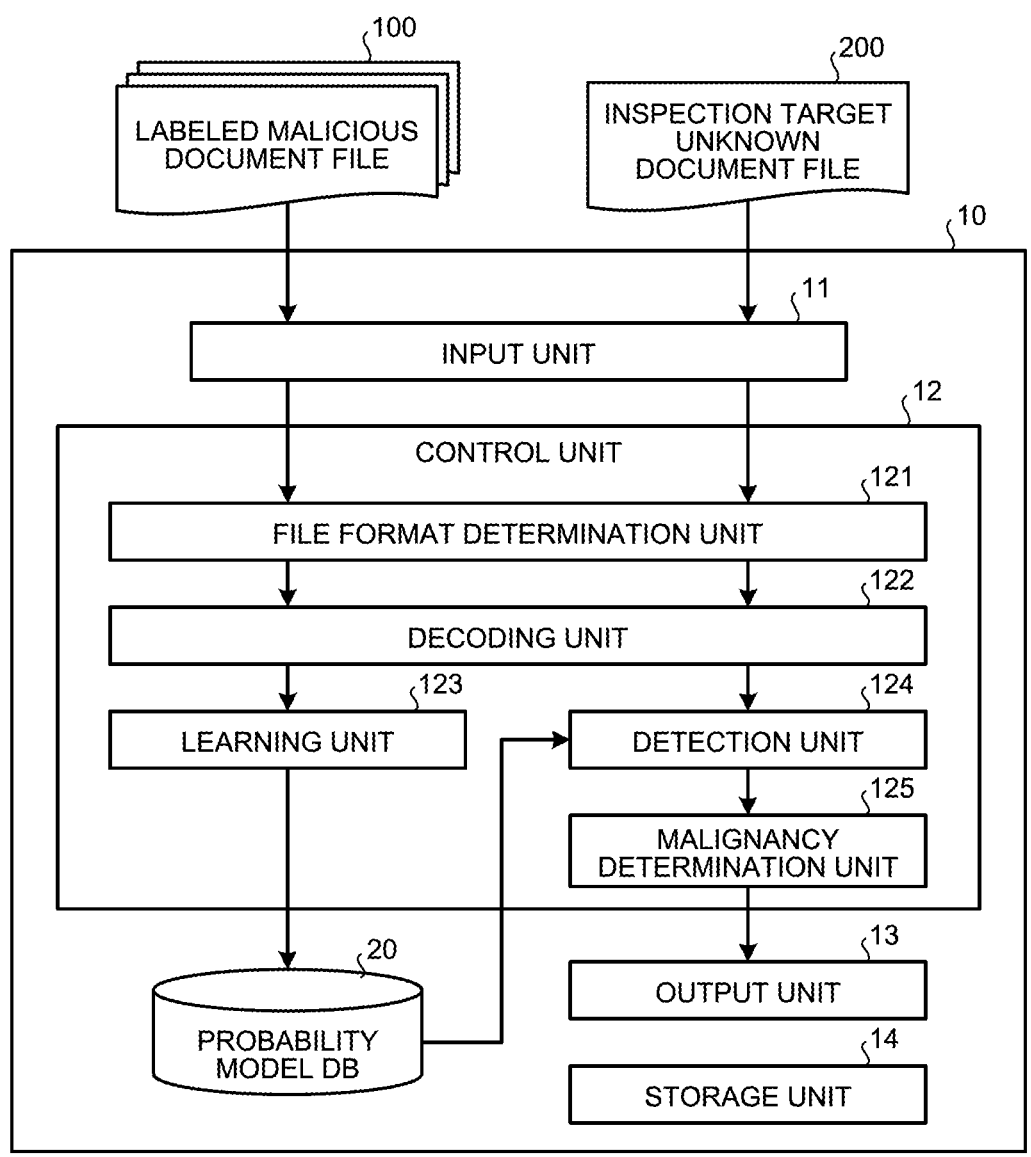
FIG. 1 is a diagram for describing an example of a configuration of an attack code detection device according to a first embodiment.

Thus, a configuration of the attack code detection device according to the first embodiment will be described with reference to FIG. 1. FIG. 1 is a diagram for describing an example of a configuration of an attack code detection device according to a first embodiment.

As illustrated in FIG. 1, an attack code detection device 10 according to the first embodiment includes an input unit 11, a control unit 12, an output unit 13, a storage unit 14, and a probability model database (DB) 20.

The input unit 11 is formed by an input device such as a keyboard and a mouse, receives input of information from the outside, and inputs the information to the control unit 12. The input unit 11 receives input of a labeled malicious document file 100 or an inspection target unknown document file 200, and outputs the input to the control unit 12. The labeled malicious document file 100 is a known malicious data series including an ROP code, and is a malicious data series in which a document label is granted to a byte being a component of a document file, and an ROP label is granted to a byte being a component of an ROP code. The inspection target unknown document file 200 is an unknown document file.

The control unit 12 includes an internal memory for storing programs and required data that define various processing procedures, and executes various types of processing using these. For example, the control unit 12 is an electronic circuit such as a central processing unit (CPU) and a micro processing unit (MPU). The control unit 12 includes a file format determination unit 121, a decoding unit 122, a learning unit 123, a detection unit 124, and a malignancy determination unit 125.

The file format determination unit 121 determines, for all input document files, by which file format the document files are formed. The file format determination unit 121 determines, for an input document file, a format of the file based on a header of the document file and the feature of a file structure. For example, as the format of the file, DOC, XLS, PPT, PDF, and the like are assumed.

Because an encoded region exists depending on the format of the document file, if an encoded region exists, the decoding unit 122 decodes the encoded region.

The learning unit 123 generates, using the labeled malicious document file 100 as learning data, a probability model that learns the feature of a byte sequence being a component of the document file, and the feature of a byte sequence being a component of an ROP code. The learning unit 123 stores the generated probability model into the probability model DB 20 in the form of a model parameter.

Based on the probability model stored in the probability model DB 20, the detection unit 124 detects an ROP code included in a data series of the inspection target unknown document file 200. Specifically, based on the probability model, the detection unit 124 performs labeling so as to indicate whether a byte sequence forming the inspection target unknown data series is a component of the document file or a component of an ROP code, and detects an ROP code included in the data series of the inspection target unknown document file 200. In other words, for the inspection target unknown document file 200, by labeling the byte sequence forming the document, with a document label or an ROP label, the detection unit 124 detects whether an ROP code part is included in the components of the inspection target unknown document file 200.

Based on the existence or non-existence of an ROP code part that has been detected by the detection unit 124, the malignancy determination unit 125 determines whether a data series of the inspection target unknown document file 200 being an inspection target is malicious data that executes attack using ROP. When the detection unit 124 detects that an ROP code part is included in the inspection target unknown document file 200, the malignancy determination unit 125 determines that the inspection target unknown document file 200 is malicious data. On the other hand, when the detection unit 124 detects that an ROP code part is not included in the inspection target unknown document file 200, the malignancy determination unit 125 determines that the inspection target unknown document file 200 is not malicious data that performs attack using ROP.

The output unit 13 is, for example, a liquid crystal display, a printer, or the like, and outputs various types of information including information regarding attack code detection. In addition, the output unit 13 may be an interface that controls input and output of various types of data between an external device, and may output various types of information to the external device.

The storage unit 14 is implemented by a semiconductor memory element such as a random access memory (RAM) and a flash memory (Flash Memory), or a storage device such as a hard disc or an optical disc, and stores processing programs for operating the attack code detection device 10, data used in the execution of the processing programs, and the like.

The probability model DB 20 accumulates the probability model generated by the learning unit 123, in the form of a model parameter. The probability model DB 20 is managed by the attack code detection device 10. As a matter of course, the probability model DB 20 may be managed by another device (server, etc.). In this case, the learning unit 123 outputs the generated probability model to a management server or the like of the probability model DB 20 via a communication interface of the output unit 13, and stores the probability model in the probability model DB 20.

[Configuration of Labeled Malicious Document File]

Figure 2:
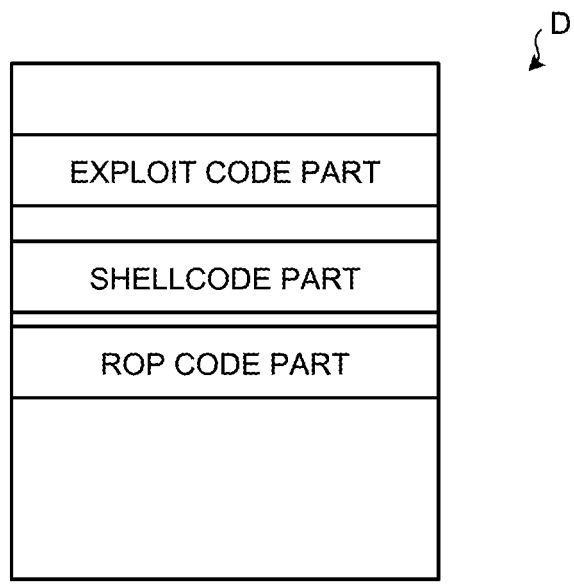
FIG. 2 is a diagram illustrating an example of a labeled malicious document file illustrated in FIG. 1.

Next, the labeled malicious document file 100 will be described. FIG. 2 is a diagram illustrating an example of a labeled malicious file 100 illustrated in FIG. 1. The labeled malicious document file 100 is obtained by researching actual malicious document files, and includes, for example, an exploit code part, a shellcode part, an ROP code part, and the like, as illustrated in a file D in FIG. 2. The learning unit 123 uses, for example, such a file D as data for learning, and generates a probability model that learns the feature of a byte sequence being a component of the document file, and the feature of a byte sequence being a component of an ROP code.

FIG. 3 is a diagram for describing an ROP code part in the file D (labeled malicious document file 100) illustrated in FIG. 2. FIG. 3 illustrates a specific example of a data series of an ROP code part and preceding and subsequent parts thereof, for the sake of description. FIG. 3 illustrates, together with the ROP code part, "0xff" as a partial byte value of a document file immediately before the ROP code part, and "0x31" as a partial byte value of a document file immediately after the ROP code part.

Here, an example in which, under the environment of little endian, addresses and constants each formed by four bytes are each divided into one byte, and recorded in order from the lowest byte is illustrated. Thus, in FIG. 3, values of respective divided bytes are arranged in one column on the left column of a Table Ta, in the order of recording. Hereinafter, the description will be given referring this column as a byte sequence.

As illustrated in FIG. 3, in the attack code detection device 10, as the labeled malicious document file 100, a file in which the respective byte values of the labeled malicious document file 100 are associated with labels indicating derivations of the respective bytes, to form pairs is used. The derivation indicates whether a corresponding byte value is a component of a document file or a component of an ROP code. In addition, in FIG. 3, names of labels associated with the respective byte values are arranged on one column on the right column of Table Ta, in accordance with the arrangement of the bytes that respectively form pairs. Hereinafter, the description will be given referring this column as a label sequence.

Here, specifically, as components of the ROP code, there are three components including ROP gadget address, constant, and junk code. The ROP gadget address is an address value indicating ROP gadget. The constant is an argument used when performing function call in ROP. Then, the junk code is provided for adjusting the position of a stack pointer, and is a code not referred to in the attack.

Hereinafter, the above three components are respectively represented as "address", "constant", and "junk". In addition, in this first embodiment, a component of a document file is represented as a "document label".

Then, as the components of the ROP code, an ROP (address 1, 2, 3, or 4) label, an ROP (constant 1, 2, 3, or 4) label, and an ROP (junk) label are used. Here, the numbers "1, 2, 3, and 4" are indices indicating the ordinal numbers of the bytes, among addresses and constants each formed by four bytes. Under the environment of the little endian, the lowest bytes of addresses and constants correspond to labels of the ROP (address 1) and the ROP (constant 1), and the highest bytes correspond to labels of the ROP (address 4) and the ROP (constant 4).

For example, for an ROP address called "0x0101acd9" that starts from the second row from the top on the left side portion of Table Ta in FIG. 3, an ROP (address 1) label is granted to a byte value "0xd9", an ROP (address 2) label is granted to a byte value "0xac", a ROP (address 3) label is granted to a byte value "0x01", and an ROP (address 4) label is granted to a byte value "0x01". Similarly, for a constant called "0x00003000" that starts from the first row from the top on the right side portion of Table Ta, an ROP (constant 1) label is granted to a byte value "0x00", an ROP (constant 2) label is granted to a byte value "0x30", an ROP (constant 3) label is granted to a byte value "0x00", and an ROP (constant 4) label is granted to a byte value "0x00".

In this manner, in the attack code detection device 10, as data for learning, data in which a document label or an ROP label is associated with each byte of the labeled malicious document file 100 is used.

In addition, the design of the label is not limited to this. For example, document label may be broken down further finely in accordance with the format of the document file. In addition, because distribution of each byte sequence is considered to vary in a word document stream including text documents, a data stream including various data, a macro storage including macro programs, and the like, these are considered to be divided.

In addition, the labeled malicious document file 100 serving as learning data is created in advance. In the creation of the labeled malicious document file 100, a malicious document file including an ROP code is discovered, and using the discovered malicious document file, division into bytes is performed by a predetermined method. Subsequently, a label is granted to each byte manually or by dynamic analysis.

For example, in the case of granting a label manually, an ROP code embedded in a document file is extracted by referring to an ROP address described in a Proof-of-Concept (PoC) code for vulnerability or the like that is generally distributed. Then, the type of a library used by ROP is researched from an address value, and labeling is performed while checking an ROP address.

In addition, in the case of granting a label by dynamic analysis, the method described in Non Patent Literature 1 can also be used. In other words, an ROP code part is extracted using a system of detecting ROP by monitoring an execution command, a state of a stack, or the like. Then, in this system, also for labeling, a label is granted by referring to an address of an executed ROP gadget.

[Learning Processing of Learning Unit]

Using a file in which a document label or an ROP label is associated with a byte the labeled malicious document file 100, as mentioned above, the learning unit 123 generates a probability model that learns the features of byte sequences included in each of the document file part and the ROP code part.

Figure 4:
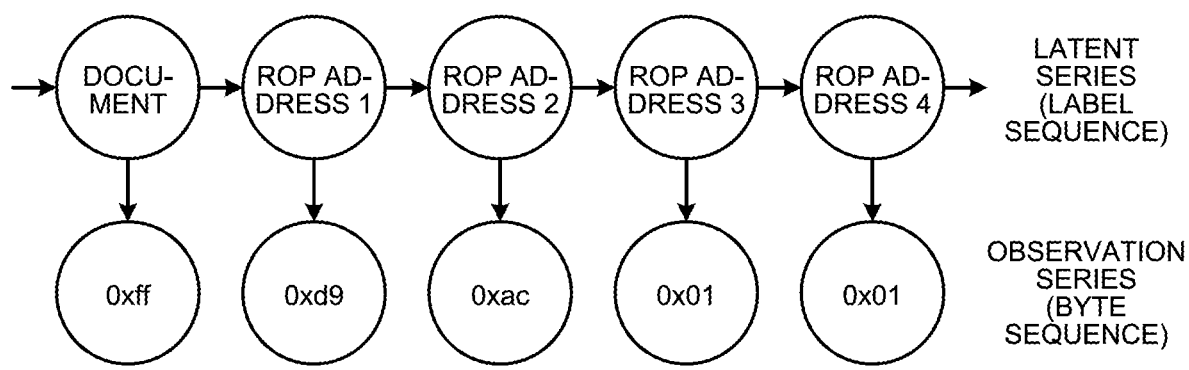
FIG. 4 is diagram that schematically associates bytes and labels in first to fifth rows of a left portion of a table in FIG. 3.

FIG. 4 is diagram that schematically associates bytes and labels in first to fifth rows of the left portion of Table Ta in FIG. 3. As mentioned above, in this first embodiment, learning data in which a label representing a derivation of each byte is associated with each byte is prepared. In other words, each byte of a document file is labeled with one of a document label and a plurality of ROP labels. Thus, it can be said that any of the labels is hidden behind each byte. Then, in the ROP attack of an attack detection target, by sequentially causing transition between short ROP gadgets, using an ROP code, codes are patched up, and a code that can implement an arbitrary operation is generated. The configuration of the ROP code is based on ROP addresses that transition, and there is association between a preceding one and a following one in such a manner that, if there is a function call issued by the ROP address, a constant follows, and if adjustment of stacks is further required, a junk is connected. Thus, it can be said that a label hidden behind each byte transitions to another label.

Thus, as illustrated in FIG. 4, a label sequence being a series in a latent state that stochastically transitions is hidden behind a byte sequence being a series that can be observed from the document file, a model that stochastically outputs a byte value for each state is considered. In addition, a byte sequence corresponds to the series that can be observed (observation series), and a label sequence corresponds to the series in the latent state (latent series). Thus, the learning unit 123 generates an output probability of an observation variable from the latent series, as one of model parameters of the probability model.

Figure 5:
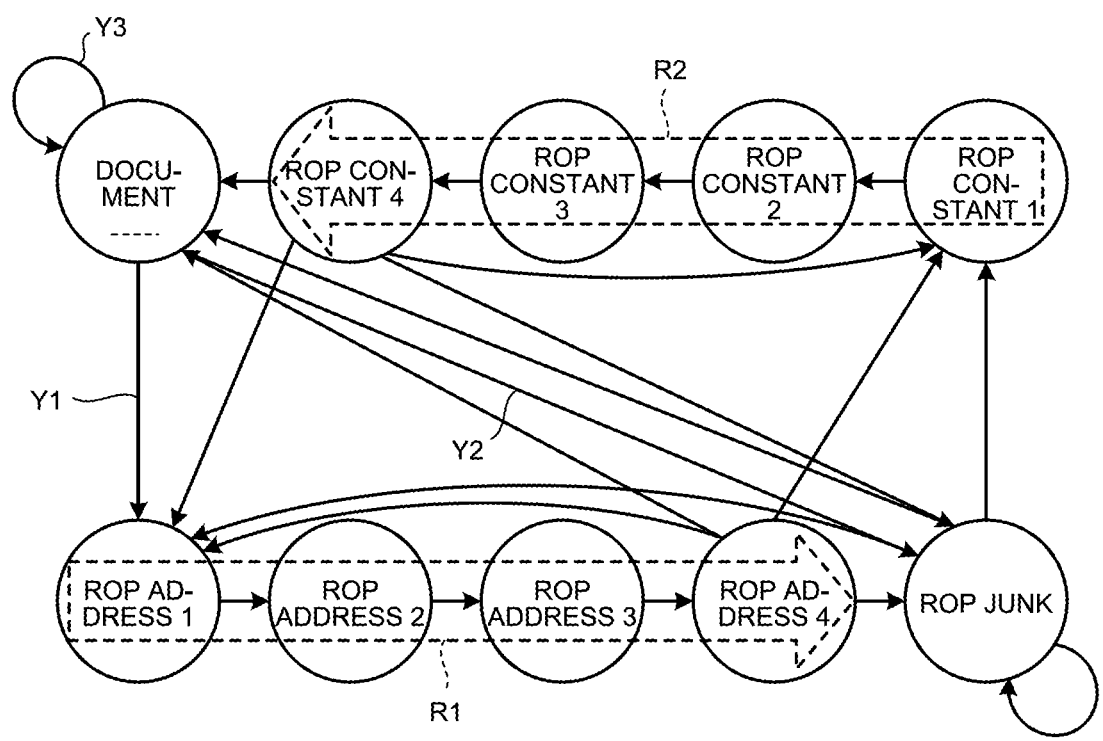
FIG. 5 is a diagram illustrating an example of transition of a label that becomes a latent variable of a latent series (label sequence).

Then, each label becoming a latent variable of the latent series (label sequence) has a feature of transitioning to another label. FIG. 5 is a diagram illustrating an example of transition of a label that becomes a latent variable of a latent series (label sequence). For example, in a graphical model such as a hidden Markov model or a conditional random field that can be applied to the problem of ROP code detection, how a latent variable transitions becomes one of important elements.

Here, as indicated by arrows R1 and R2 in FIG. 5, examples of the features of transition of the latent variable (label) include the address labels (ROP addresses 1 to 4 labels) and the constant labels (ROP constants 1 to 4 labels) having a left-to-right one-way form corresponding to four bytes. This is because addresses and constants are based on four bytes under the 32-bit environment.

Then, examples of the features of transition of the latent variable include document labels transitioning only to a document label, an address label, or a junk label (refer to arrows Y1 to Y3 in FIG. 5). This is because there exists no ROP code in which a constant comes immediately after a document.

Because existence or non-existence of an ROP code is detected based on such features in the detection of the ROP code, the learning unit 123 further generates a model that stochastically indicates a transition state of a latent variable, that is, a transition probability between latent variables, as one of model parameters of the probability model.

Through the above processing, the learning unit 123 assumes a model including an output probability of an observation variable, a transition probability between latent variables, and an initial state probability of the latent series, as model parameters, and generates a probability model as exemplified in FIGS. 6 to 8. FIG. 6 is a diagram illustrating a table that associates an initial state probability of a latent series for each latent variable (label). FIG. 7 is a diagram illustrating a table that associates an output probability of an observation variable (byte) for each latent variable (label). FIG. 8 is a diagram illustrating a table that associates a transition probability between latent variables (labels), for each combination of latent variables that transition.

First, processing until the learning unit 123 generates an output probability of an observation variable among model parameters will be described. As mentioned above, a byte sequence of a document file corresponds to an observation series, and a label sequence corresponds to a latent series. The learning unit 123 first receives, as learning data, the known labeled malicious document file 100 as learning data (for example, refer to Table Ta in FIG. 3).

Subsequently, as for an initial state probability $\pi$ of a latent variable, a probability $\pi_{document}$ starting from a latent variable corresponding to a document label is set as 1, and probabilities starting from latent variables corresponding to other labels are set to as 0. This is because it is difficult to consider a document file starting from an ROP code, for the sake of file format. Thus, the learning unit 123 generates Table T1 (refer to FIG. 6) in which "1" is associated with a document label, and "0" is associated with a label other than the document, as an initial state probability, as a model parameter indicating initial state probabilities of the latent series, and stores the table in the probability model DB 20.

Then, the learning unit 123 calculates, for all latent variables (labels), a probability at which a corresponding label outputs an observation variable (byte). Here, because a value that can be taken as an observation variable is a byte value, a set X thereof becomes X={0x00, 0xFF}. In addition, because a value that can be taken as a latent variable is a label, a set L thereof becomes L={document, ROP (address 1), . . . , ROP (address 4), ROP (constant 1), . . . , ROP (constant 4), ROP (junk)}.

Thus, for example, a probability at which a document label outputs a byte value "0x00" can be calculated by dividing "the number of bytes having values of 0x00 with a document label" by "all the number of bytes with a document label". This calculation is calculated for all of the byte value "0x00" to the byte value "0xFF". Probabilities at which the document label outputs the byte value "0x00" to the byte value "0xFF" can be thereby calculated. This calculation is calculated for all labels.

By performing these calculations, the learning unit 123 generates Table T2 (refer to FIG. 7) in which an output probability of each observation variable (byte) is associated with each latent variable (label), as a model parameter indicating an output probability of an observation variable, and stores the table in the probability model DB 20.

As the output probability of the observation variable, ith of L is denoted by $l_i$, jth of X is denoted by $x_j$, and a probability at which $l_i$ outputs $x_j$ is denoted by $b_{i,j}$. In this case, as exemplified in Table T2, for example, probabilities "$b_{document,0x00}$" to "$b_{document,0xFF}$" at which byte values "0x00" to "0xFF" are output are associated with a "document" label, and probabilities "$b_{ROP\ (address\ 1),0x00}$" to "$b_{ROP\ (address\ 1),0xFF}$" at which all byte values "0x00" to "0xFF" that can be taken are output are associated with an "ROP (address 1)" label.

Next, processing until the learning unit 123 generates a transition probability between latent variables among model parameters will be described. In this case, the learning unit 123 calculates a transition probability between labels, for all possible combinations of latent variables (labels). First, based on such a feature of transition of labels that address labels and constant labels have a left-to-right one-way form corresponding to four bytes, and such a feature of transition of labels that a document label transitions only to a document label, an address label, or a junk label that have been described using FIG. 5, and a transition state relationship of labels illustrated in FIG. 5, the learning unit 123 obtains all possible combinations of labels.

The transition probability between latent variables can be calculated for all the possible combinations of latent variables (labels) by summing the number of transitions between latent variables. For example, a transition probability from an ROP (address 4) label to an ROP (junk) label can be calculated by dividing "the number of transitions from the ROP (address 4) label to the ROP (junk) label" by "the number of all transitions from the ROP (address 4) label". The calculation is calculated for all the possible combinations of latent variables.

By calculating a transition probability between latent variables, for all the possible combinations of latent variables, the learning unit 123 generates Table T3 (refer to FIG. 8) in which a probability of transition is associated with each combination of latent variables (combination of transition source label and transition destination label), as a model parameter indicating a transition probability between latent variables, and stores the table in the probability model DB 20.

As the transition probability between latent variables, ith of L is denoted by $l_i$, jth of L is denoted by and a probability at which $l_i$ transitions to $l_j$ is denoted by $a_{i,j}$. In this case, as exemplified in Table T3, "$a_{document,\ ROP\ (address\ 1)}$" is associated with a transition probability from a "document" label to the "ROP (address 1)" label. Then, as exemplified in Table T3, transition probabilities "$a_{document,\ ROP\ (address\ 2)}$" to "$a_{document,\ document}$" are respectively associated with transitions from the "document" label to the "ROP (address 2)" label to the "document" label. Furthermore, transition probabilities to all the possible transition destination labels are similarly associated with other labels.

Furthermore, when a file such as DLL that is used for the configuration of an address part of the ROP code is identified, the learning unit 123 performs relearning based on addresses of ROP gadget candidates in the file. In addition, as premises for the learning unit 123 learning an address, an address used when the file is loaded onto a memory needs to be fixed. By the relearning, a detection rate can be kept high even if an address not included in the ROP code of the learning data is used in an inspection target.

The relearning can be implemented by updating output probabilities in the latent state from the ROP (address 1) label to the ROP (address 4) label, among model parameters. First, the learning unit 123 extracts an address list of ROP gadget candidate from the file. It is known that the extraction can be implemented using existing software.

Then, the learning unit 123 divides the extracted addresses of the ROP gadget candidates into one byte, and associates each label with each byte in such a manner that the ROP (address 1) is associated with the first byte, and the ROP (address 2) is associated with the second byte, and calculates an output probability. For example, a probability at which the ROP (address 1) label outputs the byte value "0x00" can be calculated by dividing "the number of addresses with the first byte having the value 0x00" by "the number of all addresses". By performing this calculation for labels from the "ROP (address 1)" to "ROP (address 4)", from the byte value "0x00" to the byte value "0xFF", each output probability is calculated, and a model parameter is updated, thereby performing relearning.

Subsequently, if there is a value "0" among transition probabilities and output probabilities, among probability models generated in this manner, the learning unit 123 performs smoothing processing. The smoothing processing is a method in which, if a dimension with a probability "0" exists in a vector of parameters, the probability is revised to a value other than "0". This can address such a problem that, if the one that does not appear in learning data and has occurrence probability of "0" appears in a recognition target, the one fails to be recognized, which is referred to as a zero frequency problem. As a method of the smoothing processing, there are methods such as addition smoothing and Kneser-ney smoothing. As a matter of course, the method is not limited to these methods.

In addition, after the probability model is generated, if there is a malicious document file not labeled but know as including an ROP code, by relearning this, the probability model can be refined in some cases.

For example, if an employed probability model is a hidden Markov model, the learning unit 123 may relearn the model using a Baum-Welch algorithm or the like. In addition, as a learning method that implements series labeling, there are a hidden Markov model, a conditional random field, a structuration support vector machine, and the like. As a matter of course, the method is not limited to these methods.

Figure 9:
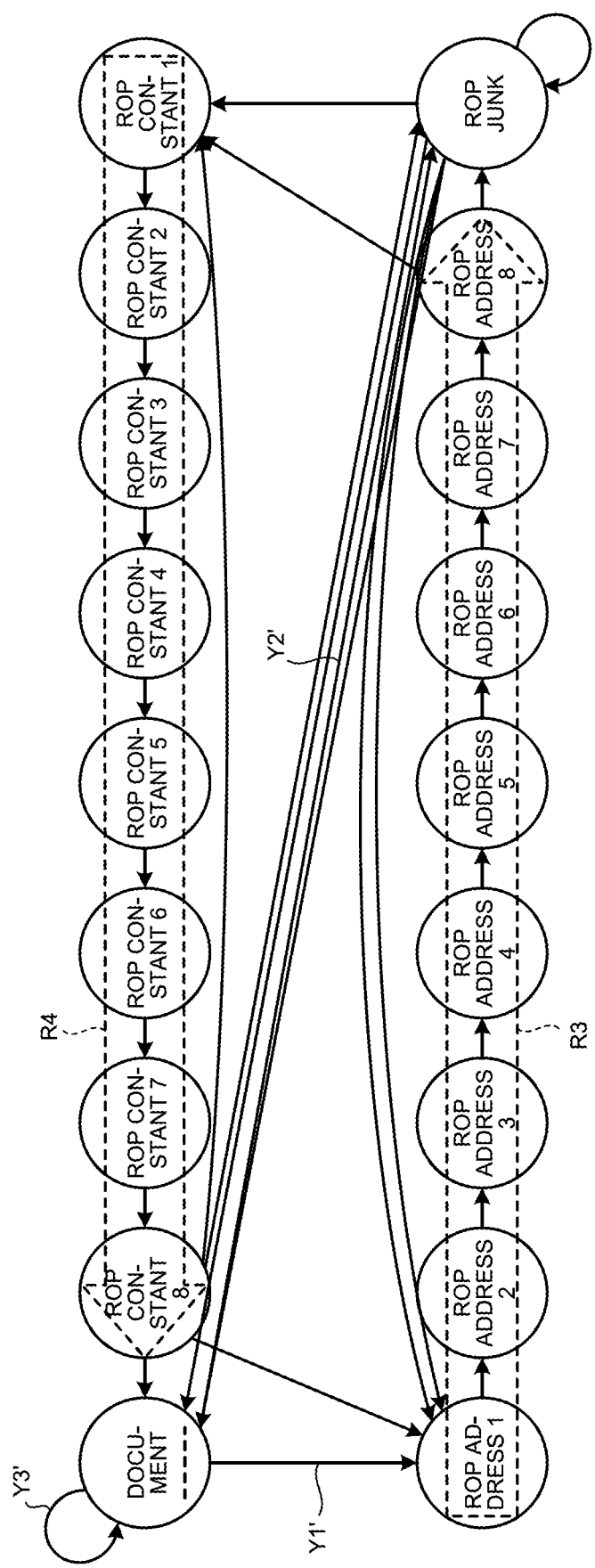
FIG. 9 is a diagram an example of transition of a label that supports a 64-bit environment.

In addition, the generation of a probability model under the 32-bit environment has been described. As a matter of course, a probability model can be generated also under a 64-bit environment. FIG. 9 is a diagram an example of transition of a label that supports a 64-bit environment. In the 64-bit environment, because a register width becomes eight bytes, the ROP address and the constant also have eight bytes.

Thus, the probability model is changed in accordance with this, and an ROP address part and a constant part that transition for every four bytes each time a latent variable (label) increases change to transition of every eight bytes. Specifically, as illustrated in FIG. 9, among latent variables, ROP address labels and ROP constant labels increase up to eight. In addition, also in the case of the 64-bit environment, address labels (ROP addresses 1 to 8 labels) and constant labels (ROP constants 1 to 8 labels) have a left-to-right one-way form corresponding to eight bytes (for example, refer to arrows R3 and R4), and a document label transitions only to a document label, an address label, or a junk label (refer to arrows Y1' to Y3' in FIG. 9).

As a matter of course, the environment is not limited to the aforementioned examples of the 32-bit and 64-bit environments. Also in another environment, a probability model can be generated by changing the number of latent variables (labels) of ROP addresses and constants, and the number of consecutive transitions in accordance with the environment.

By performing the processing described above, the learning unit 123 generates a probability model including an output probability of an observation variable, a transition probability between latent variables, and an initial state probability of a latent series, as model parameters.

[Flow Until Probability Model is Generated]

Figure 10:
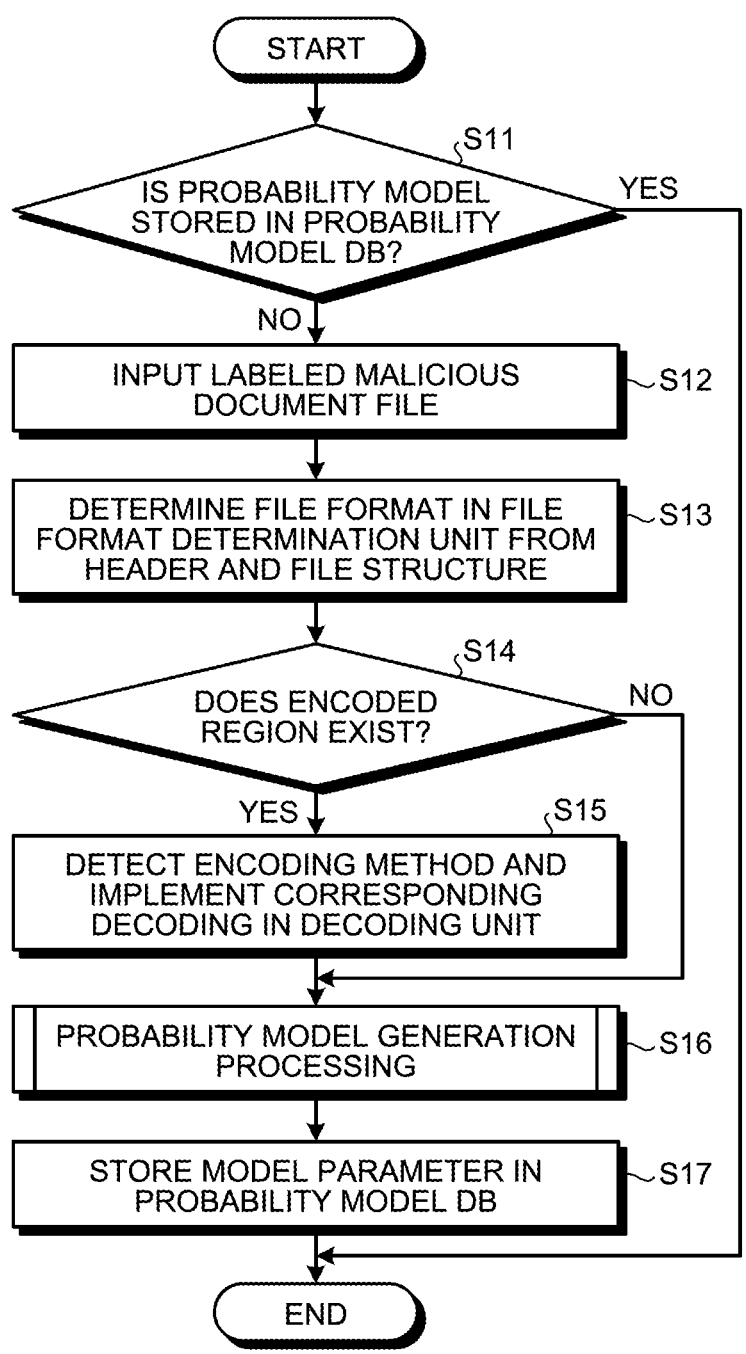
FIG. 10 is a flowchart illustrating a processing procedure performed until the attack code detection device illustrated in FIG. 1 generates a probability model.

Next, a flow until the attack code detection device 10 generates a probability model will be described. FIG. 10 is a flowchart illustrating a processing procedure performed until the attack code detection device 10 illustrated in FIG. 1 generates a probability model.

As illustrated in FIG. 10, the control unit 12 first checks the probability model DB 20, and determines whether a model parameter of a probability model corresponding to each file format is stored (Step S11). When the control unit 12 determines that a model parameter of a probability model corresponding to each file format is stored (Step S11: Yes), the control unit 12 ends the generation of the model parameter of the probability model.

In contrast to this, when the control unit 12 determines that a model parameter of a probability model corresponding to each file format is not stored (Step S11: No), the control unit 12 starts learning using the labeled malicious document file 100 as input data (Step S12). First, the file format determination unit 121 determines a file format of the input labeled malicious document file 100, from features of a header and a file structure (Step S13). Here, as the file format, for example, DOC, XLS, PPT, RTF, PDF, and the like are assumed.

Subsequently, the decoding unit 122 determines whether an encoded region exists in the input labeled malicious document file 100 (Step S14). When the decoding unit 122 determines that an encoded region exists in the input labeled malicious document file 100 (Step S14: Yes), the decoding unit 122 detects an encoding method, and implements corresponding decoding (Step S15). As the detection of an encoding method, pattern matching of known encoding methods is used.

Then, when the decoding unit 122 determines that an encoded region does not exist in the input labeled malicious document file 100 (Step S14: No), or after the end of Step S15, the learning unit 123 executes probability model generation processing of generating a probability model corresponding to a file format, from the known labeled malicious document file 100 and the file format (Step S16).

The learning unit 123 stores the generated probability model in the form of the model parameter, in the probability model DB 20 (Step S17), and ends the processing. In addition, in the present embodiment, ROP code detection and malignancy determination for a document file have been described. Nevertheless, ROP code detection and malignancy determination are not limited to this, and a similar method can be applied to an arbitrary data series.

[Flow of Probability Model Generation Processing]

Figure 11:
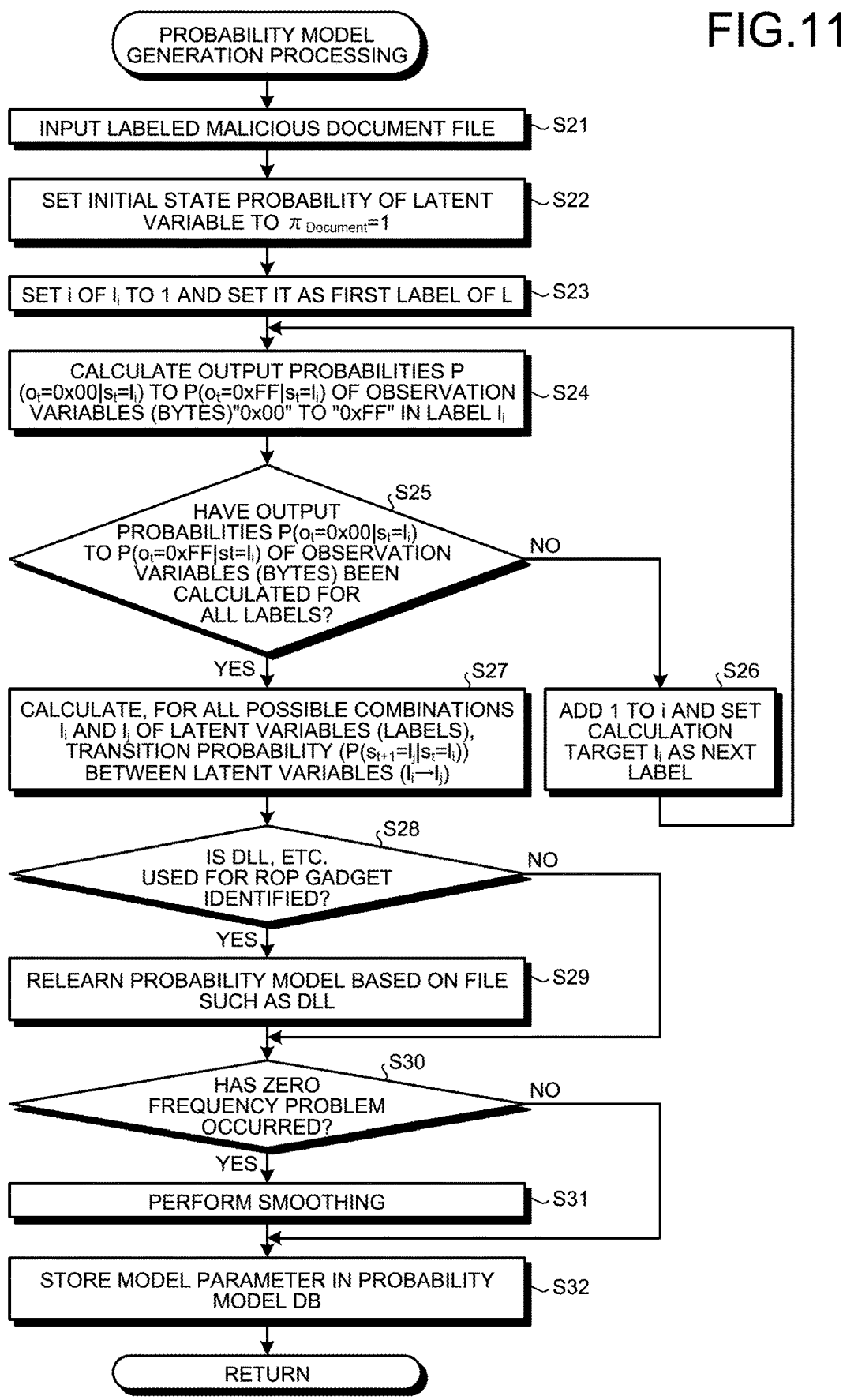
FIG. 11 is a flowchart illustrating a processing procedure of probability model generation processing illustrated in FIG. 10.

Next, a flow of probability model generation processing illustrated in FIG. 10 will be described. FIG. 11 is a flowchart illustrating a processing procedure of probability model generation processing (Step S16) illustrated in FIG. 10.

As illustrated in FIG. 11, when the labeled malicious document file 100 is input (Step S21), the learning unit 123 performs learning using data series of the ROP code part and preceding and subsequent parts thereof, from the labeled malicious document file 100.

First, the learning unit 123 sets an initial state probability of a latent variable such that a probability ($\pi_{document}$) starting from a latent variable corresponding to a document label is 1, and a probability (for example, $\pi_{ROP\ (address\ 1)}$) starting from a latent variable corresponding to another label is 0 (Step S22). The learning unit 123 generates Table T1 (refer to FIG. 6) in which "1" is associated with a document label, and "0" is associated with a label other than the document, as an initial state probability, as a model parameter indicating initial state probabilities of the latent series.

Next, for calculating, for all the latent variables (labels) $l_i$, a probability at which a corresponding label outputs an observation variable (byte), the learning unit 123 first sets i of a calculation target $l_i$ to 1, and sets it as the first label of L (Step S23). Subsequently, output probabilities $P(o_t=0x00|s_t=l_i)$ to $P(o_t=0xFF|s_t=l_i)$ of observation variables (bytes) "0x00" to "0xFF" in this label 1, are calculated (Step S24). Here, $o_t$ and $s_t$ are variables of a time t in an observation series (byte sequence) $O=o_1, o_2, \ldots, o_T$ of a length T, and a corresponding latent series (label sequence) $S=s_1, s_2, \ldots, s_T$. As mentioned above, in this calculation, for example, a probability at which the label $l_i$ outputs the byte value "0x00" is calculated by dividing "the number of bytes having values of 0x00 with the label $l_i$" by "the number of all the bytes with the label $l_i$". The learning unit 123 calculates the calculation, for the label $l_i$, for each byte value from the byte value "0x00" to the byte value "0xFF", and obtains probabilities at which the label $l_i$ outputs the byte value "0x00" to the byte value "0xFF".

The learning unit 123 determines whether output probabilities $P(o_t=0x00|s_t=l_i)$ to $P(o_t=0xFF|s_t=l_i)$ of observation variables (bytes) have been calculated for all labels (Step S25). When the learning unit 123 determines that output probabilities $P(o_t=0x00|s_t=l_i)$ to $P(o_t=0xFF|s_t=l_i)$ of observation variables (byte) "0x00" to "0xFF" have not been calculated for all labels (Step S25: No), the learning unit 123 adds 1 to i, and sets a calculation target $l_i$ as the next label (Step S26), returns to Step S24, and calculates output probabilities $P(o_t=0x00|s_t=l_i)$ to $P(o_t=0xFF|s_t=l_i)$ of observation variables (bytes) for this label.

On the other hand, when the learning unit 123 determines that output probabilities $P(o_t=0x00|s_t=l_i)$ to $P(o_t=0xFF|s_t=l_i)$ of observation variables (bytes) have been calculated for all labels (Step S25: Yes), by the calculation, the learning unit 123 can generate Table T2 (refer to FIG. 7) in which an output probability of an observation variable (byte) of each observation series (byte sequence) is associated with each latent variable (label), as a model parameter indicating an output probability of an observation variable.

Subsequently, the learning unit 123 calculates, for all possible combinations $l_i$ and $l_j$ of latent variables (labels), a transition probability ($P(s_{t+1}=l_j|s_t=l_i)$) between latent variables ($l_i \rightarrow l_j$) (Step S27). In addition, $l_i$ denotes a transition source label, and $l_j$ denotes a transition destination label.

The calculation in Step S27 can be calculated by summing the number of transitions between latent variables as mentioned above. For example, a transition probability from an ROP (address 4) label to an ROP (junk) label can be calculated by dividing "the number of transitions from the ROP (address 4) label to the ROP (junk) label" by "the number of all transitions from the ROP (address 4) label". The calculation is calculated for all the possible combinations of latent variables. By this calculation, the learning unit 123 can generate Table T3 (refer to FIG. 8) in which a probability of transition is associated with each combination of latent variables (combination of transition source label and transition destination label), as a model parameter indicating a transition probability between latent variables.

Then, the learning unit 123 determines whether a file such as DLL that is used for the configuration of an address part of the ROP code is identified (Step S28). When a file used for the configuration of an address part of the ROP code is identified (Step S28: Yes), the learning unit 123 performs relearning based on addresses of ROP gadget candidates in the file (Step S29).

Subsequently, when a file used for the configuration of an address part of the ROP code is not identified (Step S28: No), or after the processing in Step S29, the learning unit 123 determines whether the zero frequency problem in which a value "0" appears among the transition probability and the output probability occurs (Step S30). When the learning unit 123 determines that the zero frequency problem has occurred (Step S30: Yes), the learning unit 123 performs the smoothing processing (Step S31).

Then, when the learning unit 123 determines that the zero frequency problem has not occurred (Step S30: No), or after the end of the smoothing processing in Step S31, the learning unit 123 stores the model parameter of the generated probability model into the probability model DB 20 (Step S32), and ends the probability model generation processing.

By performing the processing described above, the learning unit 123 generates a probability model including an output probability of an observation variable (byte) associated with an output probability of each byte being an observation variable, for each label being a latent variable, a transition probability between latent variables that is associated with a transition probability to a latent variable to which each latent variable can transition, and an initial state probability of a latent series, as model parameters. Using the probability model, the detection unit 124, which will be mentioned later, grants a label sequence having the most probable combination of labels, to a byte sequence of the inspection target unknown document file 200, and detects existence or non-existence of an ROP code in the inspection target unknown document file 200.

[Processing of Detection Unit]

Thus, next, detection processing of the detection unit 124 will be described. Using the probability model generated by the learning unit 123, the detection unit 124 stochastically obtains the most probable combinations of labels, and grants the combinations to a byte sequence of the inspection target unknown document file 200. In other words, the detection unit 124 labels the byte sequence of the inspection target unknown document file 200 with the most probable label sequence. When a label indicating a component of the ROP code is included in the label sequence, the detection unit 124 detects the part as an ROP code.

Specifically, first, the detection unit 124 sets a model parameter of a probability model corresponding the file format determined by the file format determination unit 121, as θ, and acquires a probability model corresponding to the model parameter θ, from the probability model DB 20.

Then, the detection unit 124 extracts a byte sequence of the inspection target file as an observation series O. Subsequently, the detection unit 124 sets T as a length of the observation series O, sets a latent series (label sequence) as $S=s_1, s_2, \ldots, s_T$, sets an observation series (byte sequence) as $O=o_1, o_2, \ldots, o_T$, and the model parameter of the probability model as θ. Then, based on the probability model, the detection unit 124 assumes all possible combinations of latent series (label sequences) for the length of the observation series (byte sequence). In addition, because each of $s_1, s_2, \ldots, s_T$ is a latent variable (label) forming the latent series, $s_1, s_2, \ldots, s_T \in L$ is obtained, and because each of $o_1, o_2, \ldots, o_T$ is an observation variable (byte) forming the observation series, $o_1, o_2, \ldots, o_T \in X$ is obtained.

First, all combinations of label sequences that can be taken for the length of the byte sequence that are assumed by the detection unit 124 will be described. FIG. 12 is a diagram for describing all combinations of label sequences assumed by the detection unit 124. In Table T4 illustrated in FIG. 12, an observation series (byte sequence) $O(o_1, o_2, \ldots, o_T)$ is associated with a time $t(1, 2, 3, \ldots, T)$. Furthermore, in Table T4, each combination of all possible latent series (label sequence)$S(s_1, s_2, \ldots, s_T)$ is associated with the byte sequence $O(o_1, o_2, o_T)$.

For example, as a combination of label sequence $(s_1, s_2, \ldots, s_T)$, as indicated in the leftmost column in a label sequence $(s_1, s_2, \ldots, s_T)$ field, there is a combination "1" in which a "document" label is associated with all byte values. In addition, as indicated in the right column thereof, there is a combination "2" in which the "document" label is associated with a byte ($o_1$), the "document" label is associated with a byte ($o_2$), the "ROP (address 1)" label is associated with a byte ($o_3$), and the "document" label is associated with each of bytes ($o_4$)(not illustrated) to ($o_T$). Table T4 illustrates that, for the byte sequence $O(o_1, o_2, \ldots, o_T)$, there are "K" combinations of such label sequence $S(s_1, s_2, \ldots, s_T)$.

The detection unit 124 assumes the "K" combinations of label sequence by referring to an output probability of an observation variable, a transition probability between latent variables, and an initial state probability of a latent series. In this manner, the detection unit 124 obtains all possible combinations of labels for the length of the byte sequence, based on the probability model, and then, calculates a probability P(S, O; θ) at which the latent series (label sequence) of each of these combinations outputs a byte sequence, based on the model parameter θ.

Specifically, the detection unit 124 first calculates, for the label sequence of the combination "1", a probability P(S, O; θ) at which a byte value ("0x30", "0x00", "0x00", "0xff") of a byte sequence corresponding to each label is output from each label (all "document" labels) of the label sequence, for each byte value. Subsequently, the detection unit 124 calculates, for the next combination "2", a probability P(S, O; θ) at which a byte value ("0x30", "0x00", "0x00", "0xff") of a byte sequence corresponding to each label is output from each label ("document", "document", "ROP (address 1)", ..., "document") of the label sequence, for each byte value. The calculation is executed up to the combination "K". In addition, P(S, O; θ) is obtained by the following formula (1) when a length of an observation series is denoted by T, a probability at which an initial state of a latent series is k is denoted by $\pi_k$, a probability at which a latent variable (label)$l_i$ transitions to $l_j$ is denoted by $a_{i,j}$, and a probability at which a latent variable (label)$l_j$ outputs an observation variable (byte)$x_k$ is denoted by $b_{j,k}$.

$$P(S, O; \theta) = \pi_{s_1} \prod_{2 \leq t \leq T} a_{s_{t-1}, s_t} b_{s_t, o_t} \tag{1}$$

Then, the detection unit 124 selects a label sequence of a combination having the highest probability, from among combinations, based on the calculation result for the probability, and grants the label sequence to a byte sequence of an inspection target file. FIG. 13 is a diagram for describing an example of label sequences granted by the detection unit 124, to byte sequences of an inspection target file. Here, for example, in Table T4 in FIG. 12, when the label sequence of the combination "k" is a label sequence of a combination having the largest probability, as illustrated in Table T5 in FIG. 13, the detection unit 124 associates the label sequence of the combination "k" with the observation series (byte sequence) O, as a transition series (label sequence) S* to be associated with the byte sequence O.

In this manner, based on the probability model, the detection unit 124 grants the label sequence S* having the combination of label with the highest probability at which the byte sequence is output, to the byte sequence O of the data series of the inspection target unknown document file 200. In other words, using the probability model, based on the probability model, the detection unit 124 obtains all combinations of label that can be taken for the byte sequence O, and stochastically obtains the label sequence S* having the most probable combination of label, among the obtained combinations of label, and grant the label sequence.

Then, if there is a label indicating a component of an ROP code, in the label sequence S* granted to the byte sequence O of the inspection target document file, the detection unit 124 detects the part as an ROP code part.

By performing the processing described above, the detection unit 124 detects existence or non-existence of an ROP code part included in an inspection target data series. According to the existence or non-existence of an ROP code part that has been detected by the detection unit 124, the malignancy determination unit 125 determines whether the inspection target data series is a malicious data series that executes attack using ROP.

In addition, if the length of a series becomes longer, it becomes more difficult to calculate a probability P(S, O; θ) for a label sequence S of all possible combinations of label because a calculation amount increases. In such a case, a calculation amount can be sometimes reduced based on dynamic programming. For example, because a Viterbi algorithm can be used for the hidden Markov model and the conditional random field, S* may be obtained using such a method.

[Flow Until Determination of Inspection Target Unknown Document File]

Figure 14:
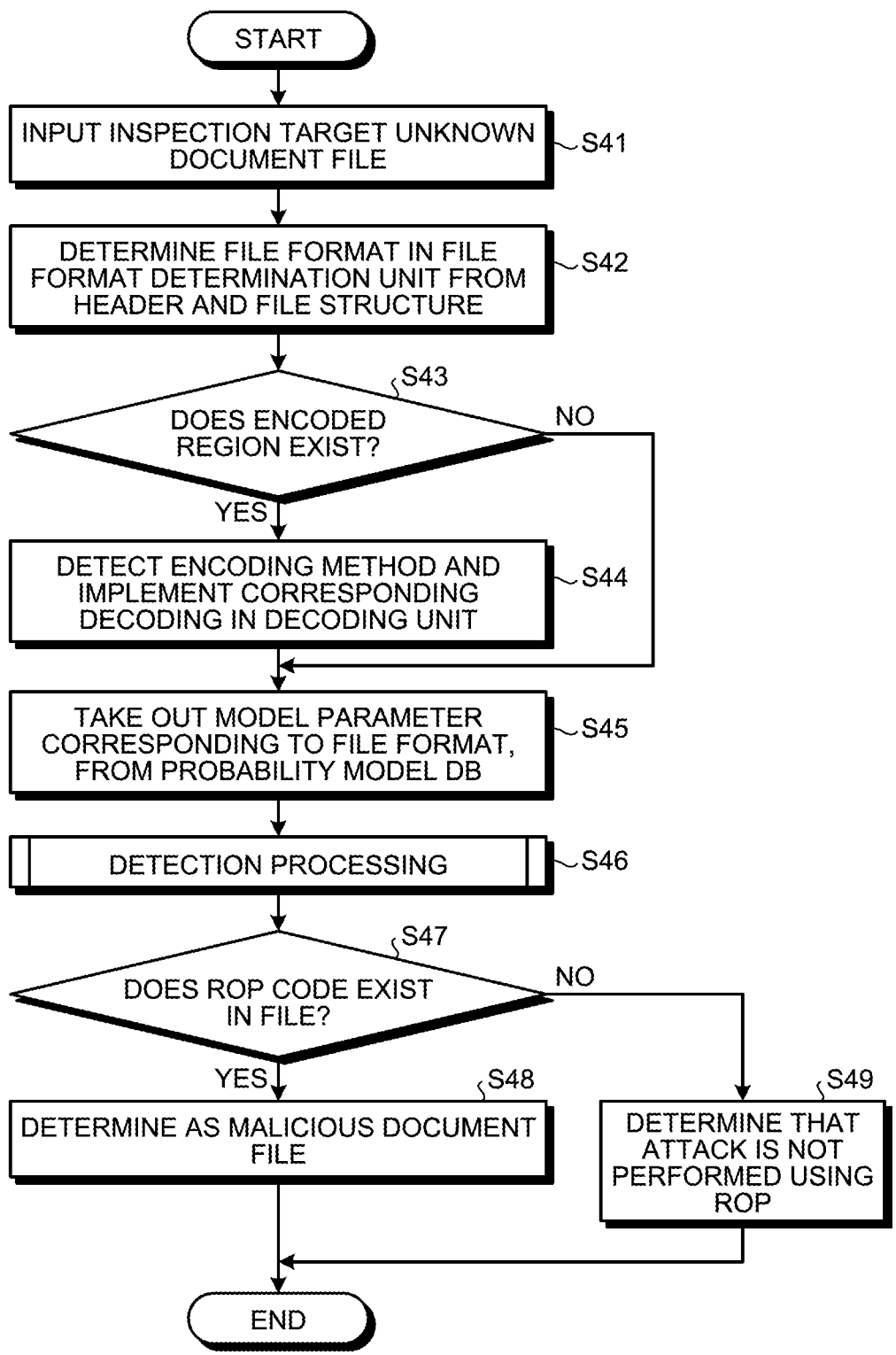
FIG. 14 is a flowchart illustrating a processing procedure performed until the attack code detection device illustrated in FIG. 1 determines an inspection target unknown document file.

Next, a flow of determination on the inspection target unknown document file 200 that is performed by the attack code detection device 10 will be described. FIG. 14 is a flowchart illustrating a processing procedure performed until the attack code detection device 10 illustrated in FIG. 1 determines the inspection target unknown document file 200.

As illustrated in FIG. 14, the attack code detection device 10 acquires the inspection target unknown document file 200 as input data (Step S41). Then, similarly to Steps S12 to S13 illustrated in FIG. 10, the file format determination unit 121 determines a file format of the input inspection target unknown document file 200 (Step S42), and when an encoded region exists (Step S43: Yes), the decoding unit 122 implements decoding (Step S44).

Then, when an encoded region does not exist (Step S43: No), or after the end of decoding in Step S44, the control unit 12 takes out a model parameter corresponding to the file format of the inspection target unknown document file 200, from the probability model DB 20 (Step S45). Then, using the model parameter (probability model), the detection unit 124 performs detection processing of detecting existence or non-existence of an ROP code in the inspection target unknown document file 200 (Step S46). The detection result of an ROP code that is obtained by the detection unit 124 is output to the malignancy determination unit 125.

Subsequently, based on the detection result of the detection unit 124, the malignancy determination unit 125 determines whether an ROP code exists in the inspection target unknown document file 200 (Step S47). When the malignancy determination unit 125 determines that an ROP code exists in the inspection target unknown document file 200 (Step S47: Yes), the malignancy determination unit 125 determines the inspection target unknown document file 200 as a malicious document file (Step S48). In contrast to this, when the malignancy determination unit 125 determines that an ROP code does not exist in the inspection target unknown document file 200 (Step S47: No), the malignancy determination unit 125 determines that the inspection target unknown document file 200 is not attacked using an ROP code (Step S49), and the control unit 12 makes an application such as a viewer application, executable, for the inspection target unknown document file 200.

[Detection Processing Flow]

Figure 15:
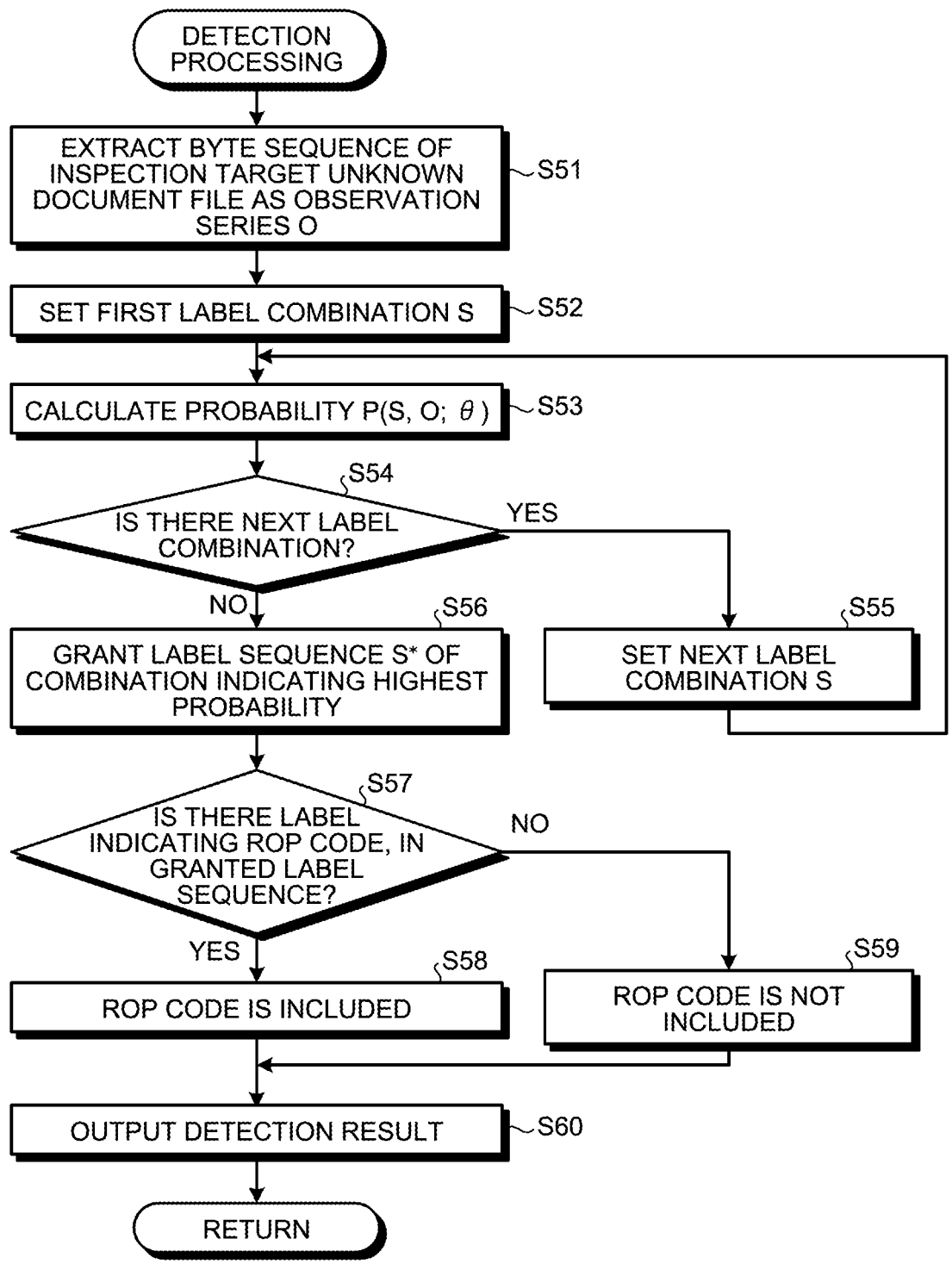
FIG. 15 is a flowchart illustrating a processing procedure of detection processing illustrated in FIG. 14.

Next, a flow of detection processing illustrated in FIG. 14 will be described. FIG. 15 is a flowchart illustrating a processing procedure of detection processing illustrated in FIG. 14.

As illustrated in FIG. 15, the detection unit 124 extracts a byte sequence of the input inspection target unknown document file 200 as an observation series O (Step S51). Then, the detection unit 124 sets, for the length T of the observation series (byte sequence) O, a combination (latent series; label sequence) S of labels that serves as the first calculation target, among a latent series (label sequence) S ($s_1, s_2, \ldots, s_T$) being all possible combinations of labels (Step S52). For example, the combination "1" of labels in FIG. 12 is set as the first calculation target.

Then, by referring to an output probability of an observation variable, a transition probability between latent variables, and an initial state probability of a latent series, the detection unit 124 calculates a probability $P(S, O; \theta)$ at which the calculation target label sequence S outputs the observation series O, based on the model parameter $\theta$ (Step S53).

Subsequently, the detection unit 124 determines whether there is the next combination (label sequence) S of labels that serves as a calculation target (Step S54). When the detection unit 124 determines that there is the next combination (label sequence) S of labels that serves as a calculation target (Step S54: Yes), the detection unit 124 sets a label sequence S of the next combination, as a calculation target (Step S55), and in Step S53, calculates a probability $P(S, O; \theta)$ also for the label sequence of the combination.

In contrast to this, when the detection unit 124 determines that there is not the label sequence S of the next combination that serves as a calculation target (Step S54: No), the detection unit 124 determines that calculation for label sequences of all possible combinations has been ended, and selects a label sequence of a combination indicating the highest probability, from among combinations, based on the calculation result for the probability, as a label sequence S* to be associated with the byte sequence O (Step S56). In other words, for the byte sequence O of the inspection target unknown document file 200, the detection unit 124 grants a label sequence of the most probable combination to a byte sequence of an inspection target file.

Then, the detection unit 124 determines whether there is a label indicating an ROP code, in the label sequence S* granted to the byte sequence O of the inspection target unknown document file 200 (Step S57). When the detection unit 124 determines that there is a label indicating an ROP code (Step S57: Yes), the detection unit 124 detects the inspection target unknown document file 200 as a file including an ROP code (Step S58). On the other hand, when the detection unit 124 determines that there is not a label indicating an ROP code (Step S57: No), the detection unit 124 detects the inspection target unknown document file 200 as a file not including an ROP code (Step S59).

The detection unit 124 outputs the detection result of the inspection target unknown document file 200 to the malignancy determination unit 125 (Step S60), and ends the detection processing.

Effect of First Embodiment

As described above, in this first embodiment, a probability model that learns the feature of a byte sequence being a component of the document file, and the feature of a byte sequence being a component of an ROP code is generated in advance. Then, in the first embodiment, based on the generated probability model, labeling is performed so as to indicate whether a byte sequence forming an inspection target unknown document file is a component of a document file or a component of an ROP code. Thus, according to this first embodiment, without opening an inspection target unknown document file using an application such as a viewer application, a component of the document file can be estimated. Thus, detection and extraction of an ROP code, and malignancy determination of the document file can be implemented at high speed using a heuristic method.

In addition, in this first embodiment, in accordance with an actual environment, addresses and constants are divided, and on a basis of the divided byte, an output probability of a byte sequence (observation series) is obtained as a model parameter, and the number of latent variables (labels) and a transition state of latent variables are considered in accordance with the actual environment, and a transition probability of a transition series, and an initial state probability of a latent series are generated as model parameters. Thus, according to the first embodiment, because detection can be performed using model parameters including a transition state of the ROP code, in accordance with the actual environment, highly-accurate detection of an ROP code can be implemented.

In this manner, according to this first embodiment, because features of the ROP code can be caught by a static method not involving the execution of an application program, high-speed and highly-accurate detection can be implemented, and furthermore, because detection is performed using a tough heuristic method, an attacker can be prevented from avoiding detection.

As mentioned above, this first embodiment is useful for the detection of an ROP code included in a document file, and is suitable for implementing inspection at high speed on a number of document files. Thus, by introducing an attack detection device 10 according to this first embodiment, an attack code detection method, and an attack code detection program, into a network together with a network monitoring device, inspection can be performed as to whether a number of document files passing through the network are malicious files including ROP codes.

In addition, this first embodiment is premised on the ROP code embedded in a document file. Nevertheless, an ROP code can be similarly detected even from data that is not a document file, if there is some sort of tendency in the distribution of byte sequences. Thus, this first embodiment can also be used for the detection of an ROP code in communication data, for example. Specifically, this first embodiment can be applied to any file of an image file, a movie file, an execution file, and the like.

Other Embodiments

[System Configuration, Etc.]

Each component of each device illustrated in the drawings is a function conceptual component, and is not required to be always physically formed as illustrated in the drawings. In other words, a specific form of separation and integration of devices is not limited to that illustrated in the drawings, and all or part of them can be mechanically or physically separated or integrated on an arbitrary basis, according to various types of loads, a status of use, and the like. Furthermore, all or any part of processing functions performed by each device can be implemented by a CPU and a program analyzed and executed by the CPU, or implemented as hardware by a wired logic.

In addition, among processes described in this embodiment, all or part of processes described as being automatically performed can be manually performed, or all or part of processes described as being manually performed can be automatically performed using a known method. In addition to this, processing procedures, control procedures, specific names, and information including various types of data and parameters that have been described in the above document or the drawings can be arbitrarily changed unless otherwise especially noted.

[Program]

Figure 16:
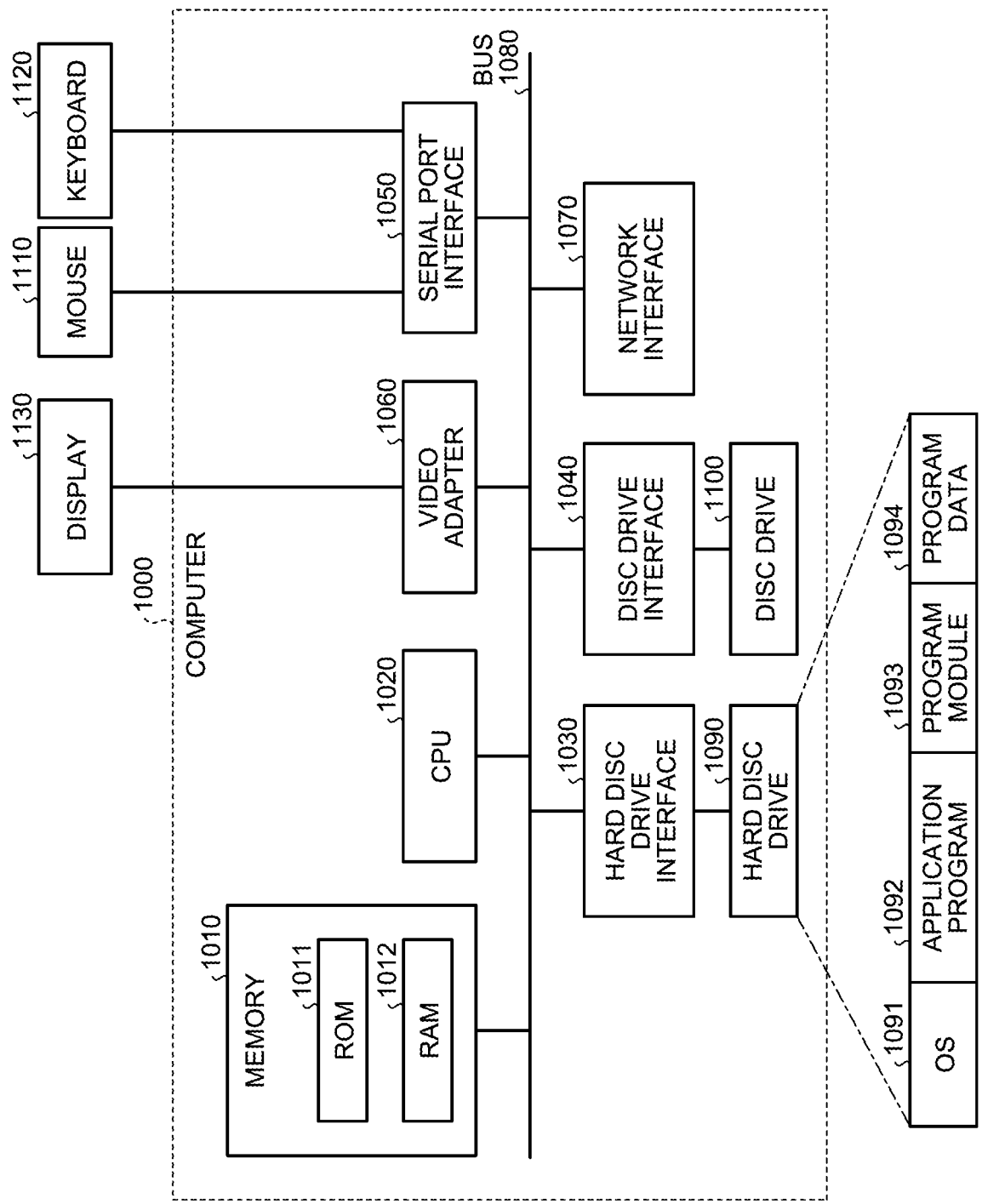
FIG. 16 is a diagram illustrating an example of a computer on which the attack code detection device is implemented by a program being executed.

FIG. 16 is a diagram illustrating an example of a computer on which the attack code detection device 10 is implemented by a program being executed. A computer 1000 includes a memory 1010 and a CPU 1020, for example. In addition, the computer 1000 includes a hard disc drive interface 1030, a disc drive interface 1040, a serial port interface 1050, a video adapter 1060, and a network interface 1070. These units are connected by a bus 1080.

A memory 1010 includes a read only memory (ROM) 1011 and a RAM 1012. The ROM 1011 stores a boot program such as a Basic Input Output System (BIOS), for example. The hard disc drive interface 1030 is connected to a hard disc drive 1090. The disc drive interface 1040 is connected to a disc drive 1100. For example, a detachable storage medium such as a magnetic disc and an optical disk is inserted into the disc drive 1100. The serial port interface 1050 is connected to a mouse 1110 and a keyboard 1120, for example. The video adapter 1060 is connected to a display 1130, for example.

The hard disc drive 1090 stores, for example, an OS 1091, an application program 1092, a program module 1093, and program data 1094. In other words, a program that defines processing of the attack code detection device 10 is implemented as the program module 1093 in which a code that can be executed by the computer 1000 is described. The program module 1093 is stored in the hard disc drive 1090, for example. For example, the program module 1093 for executing processing similar to a functional configuration in the attack code detection device 10 is stored in the hard disc drive 1090. In addition, the hard disc drive 1090 may be substituted by a Solid State Drive (SSD).

In addition, setting data used in the processing of the aforementioned embodiment is stored as the program data 1094 in the memory 1010 or the hard disc drive 1090, for example. Then, the CPU 1020 reads the program module 1093 and the program data 1094 that are stored in the memory 1010 or the hard disc drive 1090, as necessary, into the RAM 1012, and executes them.

In addition, the program module 1093 and the program data 1094 need not be always stored in the hard disc drive 1090, and may be stored in a detachable storage medium, for example, and may be read by the CPU 1020 via the disc drive 1100 or the like. Alternatively, the program module 1093 and the program data 1094 may be stored in another computer connected via a network (LAN, WAN, etc.). Then, the program module 1093 and the program data 1094 may be read by the CPU 1020 from the other computer via the network interface 1070.

The embodiment to which the invention devised by the present inventor is applied has been described above. Nevertheless, the present invention is not limited by the description and the drawings that constitute part of the disclosure of the present invention according to the present embodiment. In other words, other embodiments, examples, operational technologies, and the like that are conceived based on the present embodiment by those skilled in the art are all included in the scope of the present invention.

REFERENCE SIGNS LIST

10 ATTACK CODE DETECTION DEVICE
11 INPUT UNIT
12 CONTROL UNIT
13 OUTPUT UNIT
14 STORAGE UNIT
20 PROBABILITY MODEL DATABASE (DB)
100 LABELED MALICIOUS DOCUMENT FILE
121 FILE FORMAT DETERMINATION UNIT
122 DECODING UNIT
123 LEARNING UNIT
124 DETECTION UNIT
125 MALIGNANCY DETERMINATION UNIT

200 INSPECTION TARGET UNKNOWN DOCUMENT FILE

The invention claimed is:

1. An attack code detection device comprising:
    a memory; and
    a processor coupled to the memory and that executes a process comprising:
    generating a model that learns, using a known malicious data series including a Return Oriented Programming (ROP) code, as learning data, a feature of a byte sequence being a component of a data series, and a feature of a byte sequence being a component of the ROP code;
    detecting, for each byte sequence, the ROP code included in an inspection target unknown data series, based on the model; and
    determining, using a detection result, whether the inspection target unknown data series is a malicious data series that executes attack using ROP,
    wherein the inspection target unknown data series is an unknown document file, and the detection of the ROP code included in the inspection target unknown data series is performed without opening the unknown document file using a viewer application.

2. The attack code detection device according to claim 1, wherein, based on the model, the detecting obtains a component of a data series included in a byte sequence forming the inspection target unknown data series, or a component of the ROP code included in the inspection target unknown data series, and detects the ROP code included in the inspection target unknown data series.

3. The attack code detection device according to claim 2,
    wherein the generating generates the model in which a byte sequence in the malicious data series is an observation series, and a label sequence is a latent series, by learning the malicious data series in which a byte being the component of the data series is labeled with a data label indicating that the byte is the component of the data series, and a byte being the component of the ROP code is labeled with an ROP label indicating that the byte is the ROP code,
    wherein, based on the model, the detecting grants, to a byte sequence of the inspection target unknown data series, a label sequence having a combination of a label with a highest probability at which the byte sequence is output, and detects whether the ROP label is included in the granted label sequence, and
    wherein, in a case where it is detected that the ROP label is included in the label sequence granted, the determining determines the inspection target unknown data series as the malicious data series, and in a case where it is detected that the ROP label is not included in the label sequence granted, determines the inspection target unknown data series as not a malicious data series that performs attack using the ROP.

4. The attack code detection device according to claim 3,
    wherein the generating generates the model including an output probability of an observation variable associated with an output probability of each byte being the observation variable, for each of the label being a latent variable, a transition probability between the latent variables that is associated with a transition probability to the latent variable to which each of the latent variables can transition, and an initial state probability of the latent series, as model parameters, and
    wherein, based on the model, the detecting stochastically obtains a label sequence having a most probable combination of labels, among all possible combinations of labels, and grants to a byte sequence in the inspection target unknown data series.

5. The attack code detection device according to claim 4, wherein, in a case where a length of the inspection target unknown data series is denoted by T, based on the model, when a possible label sequence is denoted by $S=s_1, s_2, \ldots, s_T$, an observed byte sequence is denoted by $O=o_1, o_2, \ldots, o_T$, and a model parameter of the model is denoted by $\theta$, the detecting obtains a label sequence $S^*$ having a highest probability $P(S, O; \theta)$, for a byte sequence O, and grants the obtained label sequence $S^*$ to the byte sequence O.

6. The attack code detection device according to claim 1, wherein, based on a labeled malicious data series method using manual or predetermined dynamic analysis for the malicious data series including the ROP code, the generating generates the model that learns the malicious data series in which labeling is implemented on each byte.

7. The attack code detection device according to claim 1, wherein the malicious data series is a document file.

8. An attack code detection method executed by an attack code detection device, the attack code detection method comprising:
    a process of generating, by the attack code detection device, a model that learns, using a known malicious data series including a Return Oriented Programming (ROP) code, as learning data, a feature of a byte sequence being a component of a data series, and a feature of a byte sequence being a component of the ROP code;
    a process of detecting, by the attack code detection device and for each byte sequence, the ROP code included in an inspection target unknown data series, based on the model; and
    a process of determining, by the attack code detection device, using a detection result, whether the inspection target unknown data series is a malicious data series that executes attack using ROP,
    wherein the inspection target unknown data series is an unknown document file, and the detection of the ROP code included in the inspection target unknown data series is performed without opening the unknown document file using a viewer application.

9. A non-transitory computer-readable recording medium having stored therein an attack code detection program for causing a computer to execute a process comprising:
    generating a model that learns, using a known malicious data series including a Return Oriented Programming (ROP) code, as learning data, a feature of a byte sequence being a component of a data series, and a feature of a byte sequence being a component of the ROP code;
    detecting, for each byte sequence, the ROP code included in an inspection target unknown data series, based on the model; and
    determining, using a detection result, whether the inspection target unknown data series is a malicious data series that executes attack using ROP,
    wherein the inspection target unknown data series is an unknown document file, and the detection of the ROP code included in the inspection target unknown data series is performed without opening the unknown document file using a viewer application.

* * * * *